(12) United States Patent
Fu et al.

(10) Patent No.: US 10,581,600 B2
(45) Date of Patent: Mar. 3, 2020

(54) SYSTEM, METHOD, AND APPARATUS FOR QUANTUM KEY OUTPUT, STORAGE, AND CONSISTENCY VERIFICATION

(71) Applicant: ALIBABA GROUP HOLDING LIMITED, George Town, Grand Cayman (KY)

(72) Inventors: Yingfang Fu, Beijing (CN); Shuanlin Liu, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 188 days.

(21) Appl. No.: 15/177,007

(22) Filed: Jun. 8, 2016

(65) Prior Publication Data
US 2016/0359626 A1  Dec. 8, 2016

(30) Foreign Application Priority Data
Jun. 8, 2015 (CN) .......................... 2015 1 0309787

(51) Int. Cl.
*H04L 9/08* (2006.01)
(52) U.S. Cl.
CPC .................. *H04L 9/0858* (2013.01)
(58) Field of Classification Search
CPC .................................................. H04L 9/0858
USPC .......................................................... 380/279
See application file for complete search history.

(56) References Cited

U.S. PATENT DOCUMENTS

| | | | | |
|---|---|---|---|---|
| 2004/0190719 A1* | 9/2004 | Lo | ......................... | H04L 1/0041 380/255 |
| 2006/0056630 A1* | 3/2006 | Zimmer | ................ | B82Y 10/00 380/256 |
| 2006/0062392 A1* | 3/2006 | Lee | ....................... | H04L 9/0852 380/278 |
| 2007/0076871 A1* | 4/2007 | Renes | .................. | H04L 9/0858 380/201 |

(Continued)

FOREIGN PATENT DOCUMENTS

| CN | 201830272 U | 5/2011 |
|---|---|---|
| CN | 103081396 A | 5/2013 |

(Continued)

OTHER PUBLICATIONS

Miloslav Dusek; Quantum Cryptography; arxiv.org; 2006; p. 1-61.*
(Continued)

*Primary Examiner* — Monjur Rahim
(74) *Attorney, Agent, or Firm* — Finnegan, Henderson, Farabow, Garrett & Dunner, LLP

(57) ABSTRACT

A method for quantum key output is disclosed. The method may be implemented by a first quantum key management device. The method may comprise obtaining a first key acquisition request from a first data device, acquiring a first quantum key from a first quantum key distribution device, according to the obtained first key acquisition request, storing the acquired first quantum key in a same management device address range as a corresponding second quantum key acquired by a second quantum key management device, performing a first consistency verification including determining whether the first quantum key is the same as the second quantum key, and sending the first quantum key to the first data device, if the first quantum key is determined to be the same as the second quantum key.

24 Claims, 10 Drawing Sheets

(56) References Cited

U.S. PATENT DOCUMENTS

| | | | |
|---|---|---|---|
| 2007/0076884 A1* | 4/2007 | Wellbrock | H04L 9/0858 380/263 |
| 2011/0064222 A1* | 3/2011 | Wiseman | H04L 9/0827 380/255 |
| 2012/0195428 A1* | 8/2012 | Wellbrock | H04L 9/0855 380/255 |
| 2014/0143443 A1* | 5/2014 | Takahashi | H04L 45/20 709/241 |
| 2014/0258730 A1 | 9/2014 | Stecher | |
| 2014/0331050 A1* | 11/2014 | Armstrong | H04L 9/0855 713/171 |
| 2014/0365774 A1 | 12/2014 | Tanizawa et al. | |
| 2015/0036824 A1* | 2/2015 | Dixon | H04L 9/0852 380/279 |
| 2015/0036825 A1* | 2/2015 | Tanizawa | H04L 9/0858 380/279 |

FOREIGN PATENT DOCUMENTS

| | | | |
|---|---|---|---|
| CN | 104660602 A | 5/2015 | |
| CN | 104660603 A | 5/2015 | |

OTHER PUBLICATIONS

PCT International Search Report and Written Opinion dated Aug. 30, 2016, issued in corresponding International Application No. PCT/US16/36433 (9 pages).
SIPO Chinese Search Report issued in corresponding Chinese Application No. CN2015103097876.4 dated Dec. 14, 2018, 2 pages.
SIPO First Chinese Office Action issued in corresponding Chinese Application No. CN2015103097876.4 dated Dec. 24, 2018, 61 pages.

* cited by examiner

100

SYSTEM, METHOD, AND APPARATUS FOR QUANTUM KEY OUTPUT, STORAGE, AND CONSISTENCY VERIFICATION

CROSS REFERENCE TO RELATED APPLICATION

The present application is based on and claims the benefits of priority to Chinese Application No. 201510309787.4, filed Jun. 8, 2015, the entire contents of which are incorporated herein by reference.

TECHNICAL FIELD

The present application relates to methods, apparatus, and systems for quantum key output, storage, and consistency verification.

BACKGROUND

To ensure security of data transmission, a data device of a sender usually uses an encryption algorithm for encryption, while a data device of a receiver uses a corresponding decryption algorithm to decrypt received data. Classical cryptography may provide a solution for secure transmission of data, but security of the classical cryptography is based on computation complexity, and with rapid advances of computing capability in cloud computing and quantum computing, the classical cryptography has a high risk of being cracked. Quantum cryptography being a cross product of quantum mechanics and cryptography, its security is ensured based on the principle of quantum mechanics (the uncertainty principle of unknown quantum states, the principle of collapse after measurement, and the principle of no-clone), and is unrelated to computing capabilities or storage capabilities of attackers, and thus, can provide secured data transmission. In addition, quantum keys, belonging to matching keys (matching may be interchangeable with being the same in this disclosure), have a low computing cost for performing data encryption and decryption and a relatively high execution efficiency, and thus have become an ideal choice for secured data transmission.

FIG. 1 is a schematic diagram of a quantum key output system in prior art. A basic process of using quantum keys to perform secret transmission of data includes: quantum key distribution devices located at a sender and a receiver negotiating quantum keys through a quantum key distribution protocol, and, in accordance with requirements of key management devices, providing quantum keys stored in the same address range to the corresponding key management devices; the key management devices of the sender and the receiver storing the received quantum keys by using the same address range, and, in accordance with key acquisition requests of corresponding data devices, outputting the quantum keys stored in the same address range to the data devices, and the data device of the sender performing encryption transmission on data to be sent by using an acquired quantum key, and the data device of the receiver decrypting the received data by using the acquired quantum key.

During actual applications, the above-mentioned processing process may have the following problems:

(1) when the quantum keys acquired by the quantum key distribution devices are sent to and written into the corresponding quantum key management devices, due to reasons such as network packet loss or errors occurring in writing of hard drive data, the quantum keys output by the key management devices of the sender and the receiver to the data devices of the sender and the receiver in accordance with the same storage address may be not the same, which is generally referred to as asymmetry or inconsistency, thereby causing the data device of the receiver not to perform a correct decryption operation and the correct original data not be acquired; and (2) when the number of times for the data devices of the sender and the receiver to acquire inconsistent quantum keys exceeds a preset threshold, the quantum key management devices of the sender and the receiver may need to empty all the acquired quantum keys, for example, by rebooting, which wastes the generated quantum keys.

SUMMARY

One aspect of the present disclosure is directed to a method for quantum key output is disclosed. The method may be implemented by a first quantum key management device. The method may comprise obtaining a first key acquisition request from a first data device, acquiring a first quantum key from a first quantum key distribution device, according to the obtained first key acquisition request, storing the acquired first quantum key in a same management device address range as a corresponding second quantum key acquired by a second quantum key management device, performing a first consistency verification including determining whether the first quantum key is the same as the second quantum key, and sending the first quantum key to the first data device, if the first quantum key is determined to be the same as the second quantum key.

Another aspect of the present disclosure is directed to a quantum key output system, comprising a first quantum key management device. The a first quantum key management device may be configured to obtain a first key acquisition request from a first data device of the quantum key output system, acquire a first quantum key from a first quantum key distribution device of the quantum key output system, according to the obtained first key acquisition request, store the acquired first quantum key in a same management device address range as a corresponding second quantum key acquired by a second quantum key management device of another quantum key output system, perform a first consistency verification including determining whether the first quantum key is the same as the second quantum key, and send the first quantum key to the first data device, if the first quantum key is determined to be the same as the second quantum key.

Another aspect of the present disclosure is directed to a non-transitory computer-readable storage medium storing one or more programs. The one or more programs may comprises instructions which, when executed by a processor of a computer system including a first quantum key management device, cause the computer system to perform a method. The method may comprises obtaining a first key acquisition request from a first data device, acquiring a first quantum key from a first quantum key distribution device, according to the obtained first key acquisition request, storing the acquired first quantum key in a same management device address range as a corresponding second quantum key acquired by a second quantum key management device, performing a first consistency verification including determining whether the first quantum key is the same as the second quantum key, and sending the first quantum key to the first data device, if the first quantum key is determined to be the same as the second quantum key.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In this disclosure, a quantum key output method and apparatus, a quantum key acquisition method and apparatus, a quantum key storage and output method and apparatus, a quantum key distribution and storage method and apparatus, a quantum key output system and a method and apparatus for verifying storage consistency of quantum keys are provided respectively, which are described in detail in the following embodiments. Before the embodiments are described in detail, a brief description of various devices and processing flows is provided.

Figure 1:
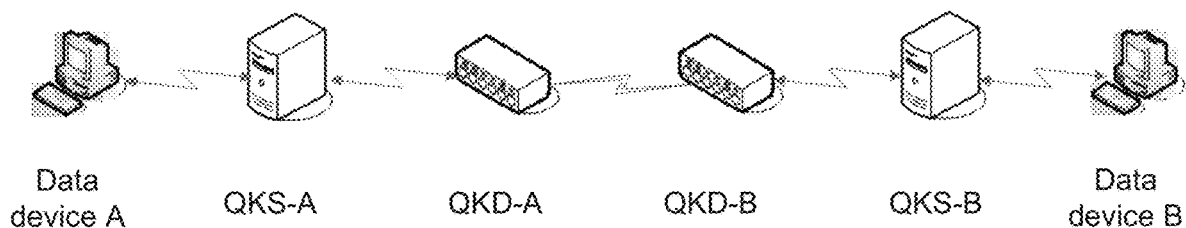
FIG. 1 is a schematic diagram of a quantum key output system in prior art.

FIG. 1 is a schematic diagram of a quantum key output system 100 in prior art. From the perspective of data encryption and decryption transmission, the quantum key output system may include two sides/parties (i.e., sender and receiver) symmetric to each other, in which one side including: a quantum key distribution device (QKD-A), a key management device (i.e., a quantum key management system device QKS-A), and a data device A, and the other side including: a quantum key distribution device (QKD-B), a key management device (QKS-B) and a data device B. The devices on each side and devices of the same types on the opposite side are mutually peer devices, and in order to facilitate description, this disclosure may refer to devices of either side as a sender or a receiver device, for example, quantum key distribution devices of the sender and the receiver, key management devices of the sender and the receiver and data devices of the sender and the receiver. Devices in the sender or the receiver side can also be respectively identified as first devices or second devices.

The quantum key distribution (QKD) devices of the sender and the receiver may be configured to perform quantum key negotiations, the quantum key management system (QKS) devices of the sender and the receiver may be configured to store quantum keys acquired from the QKD devices and to output the acquired quantum keys to the data devices, and the data devices of the sender and the receiver may perform a corresponding data encryption or data decryption operation respectively by using the acquired quantum keys. Since a network transmission process between the QKD devices and the QKS devices may have packet losses and errors may occur to the QKS devices when storing the quantum keys, the quantum keys output to the data devices of the sender and the receiver by the QKS devices of the sender and the receiver may not match. In light of this, this disclosure discloses performing a consistency verification of the quantum keys between the QKS devices of the sender and the receiver, and sending quantum keys that pass the consistency verification to the data devices. Thus, from the perspective of the QKS devices, the quantum keys output to the data devices of the sender and the receiver can be matching (i.e., symmetrical).

The subsequent description below may expand from the system illustrated in FIG. 1. It should be noted that FIG. 1 is described from the perspective of outputting quantum keys. During actual implementations, each of the QKD devices of the sender and the receiver, each of the QKS devices of the sender and the receiver, and each of the data devices of the sender and the receiver may be connected via classical channels in wired, wireless, or other forms, to perform operations such as negotiations and data transmission, and corresponding connection relationships are not shown in the FIG. 1.

Figure 2:
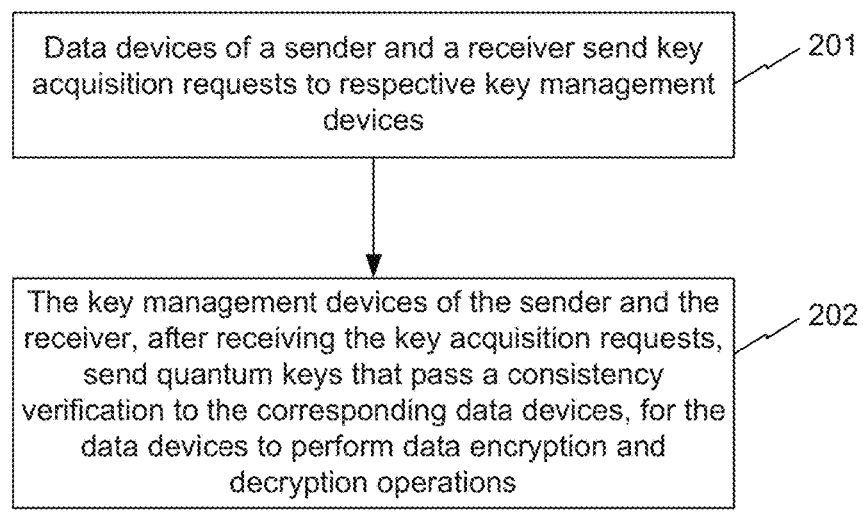
FIG. 2 is a flow diagram illustrating a method for quantum key output, according to an exemplary embodiment.

FIG. 2 is a flow diagram illustrating a quantum key output method 200, according to an exemplary embodiment. Method 200 may be implemented by a non-transitory computer-readable storage medium storing one or more programs, the one or more programs comprising instructions which, when executed by a processor of a computer system, cause the computer system to perform method 200. Method 200 and related steps described below may also be implemented by a first quantum key management device of a quantum key output system. Method 200 may include a number of steps, some of which may be optional:

Step 201. Data devices of a sender and a receiver send key acquisition requests separately to respective key management devices.

Step 202. The key management devices of the sender and the receiver, after receiving the key acquisition requests, send quantum keys that pass a consistency verification to the corresponding data devices, for the data devices to perform data encryption and decryption operations.

In some embodiments, the data devices can acquire keys from the key management devices in real time (referred to as a real-time acquisition mechanism) or can pre-acquire quantum keys (referred to as a pre-acquiring mechanism). The real-time acquisition mechanism may include: the data device A and the data device B sending a request for acquiring a quantum key to respective QKS-A device and QKS-B device, and the QKS-A device and the QKS-B device, having pre-stored quantum keys passing consistency verification, outputting the quantum keys to the data device A and the data device B.

The pre-acquiring mechanism may include: the data device A and the data device B sending a request for acquiring a quantum key to respective QKS-A device and QKS-B device, the QKS-A device and the QKS-B device, having no pre-stored quantum keys, forwarding the request to the QKD-A device and the QKD-B device respectively, the QKD-A device and the QKD-B device negotiating a quantum key pair for the data device A and the data device B through a quantum key distribution protocol and sending the quantum key pair to the QKS-A device and the QKS-B device, and the QKS-A device and the QKS-B device performing consistency verification on the stored quantum keys and sending quantum keys that pass the consistency verification to the data device A and the data device B.

The above two quantum key acquisition mechanisms can perform consistency verification of quantum keys of the QKS-A device and the QKS-B device, for outputting matching quantum keys to the data device A and the data device B. The two implementation mechanisms are described below in exemplary embodiments, but it should be noted that all private information may be transmitted via a classical channel. For example, quantum key information can be encrypted by using a key agreed by two parties of communication. For another example, quantum keys acquired by the two parties of communication in a previous time can be used for encryption, and for the first transmission, a shared key preset by two parties of communication can be used for encryption.

Figure 3:
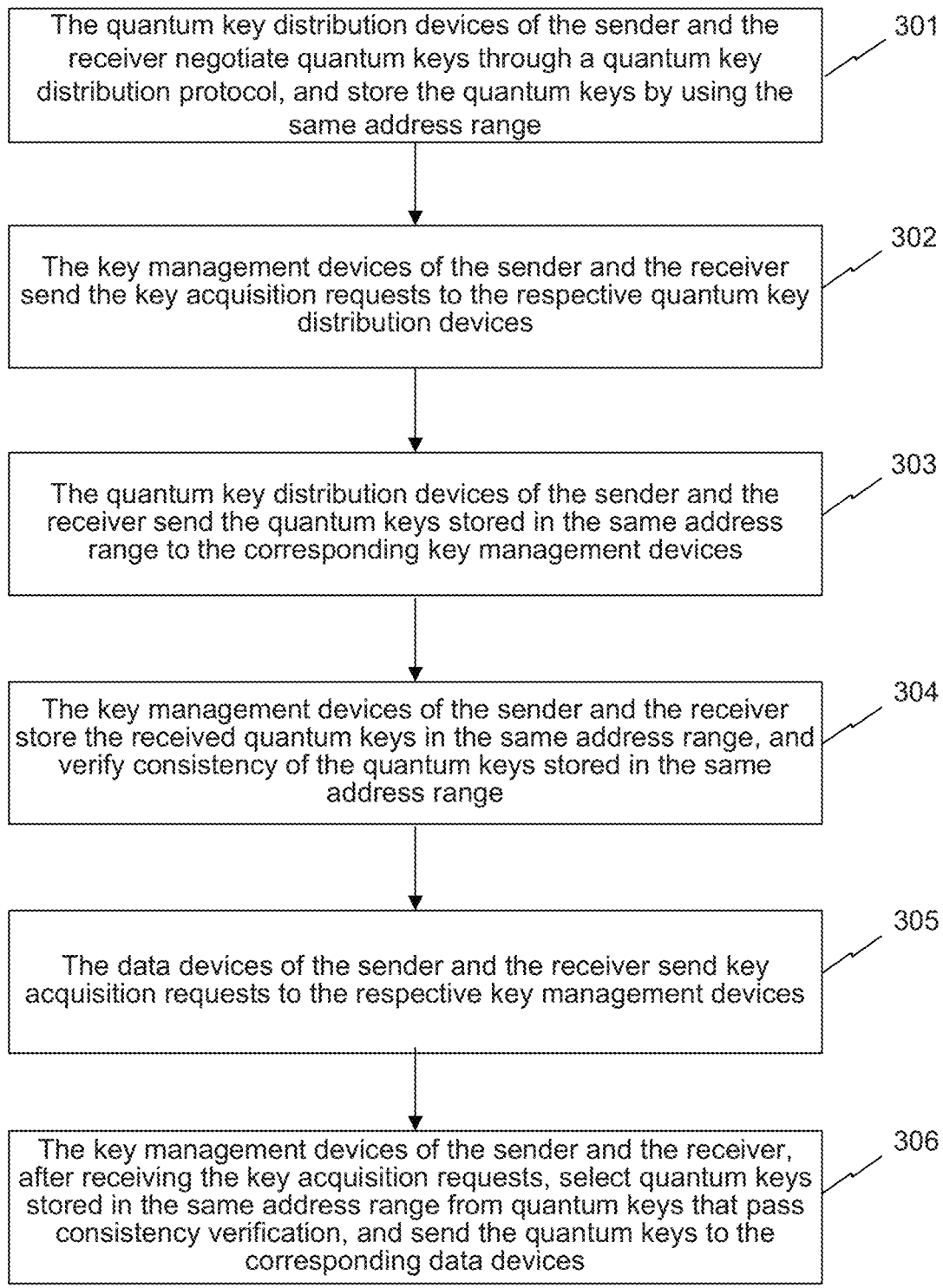
FIG. 3 a flow diagram illustrating a quantum key output method based on a real-time acquisition mechanism, according to an exemplary embodiment.
Figure 4:
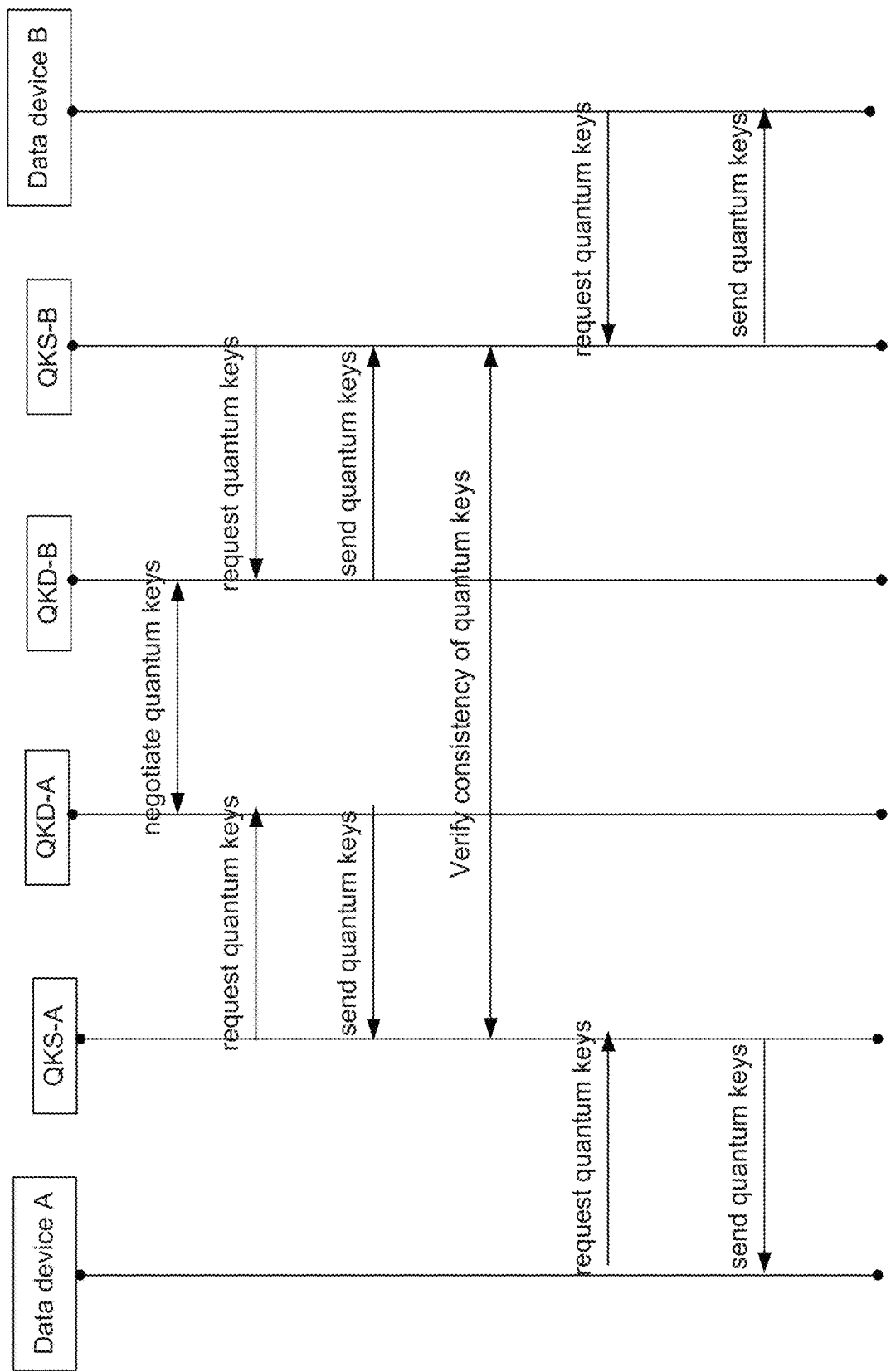
FIG. 4 is a flow diagram illustrating interactions among various devices based on the real-time acquisition mechanism, according to an exemplary embodiment.

FIG. 3 is a flow diagram illustrating a quantum key output method 300 based on a real-time acquisition mechanism, according to an exemplary embodiment. Correspondingly, FIG. 4 provides a flow diagram illustrating interactions among various devices based on the real-time acquisition mechanism, according to the exemplary embodiment. Method 300 may be implemented by a non-transitory computer-readable storage medium storing one or more programs, the one or more programs comprising instructions which, when executed by a processor of a computer system, cause the computer system to perform method 300. Method 300 may include a number of steps, some of which may be optional:

Step 301. The quantum key distribution devices of the sender and the receiver negotiate quantum keys through a quantum key distribution protocol, and store the quantum keys by using the same address range.

The QKD-A device and the QKD-B device may negotiate matching quantum keys or two corresponding copies of a quantum key through a quantum key distribution protocol, e.g., a BB84 protocol, (this process may be referred to as a quantum key negotiation process), and store the quantum keys in the same address range of respective storage media. The storage media may include caches, magnetic disks, and so on. The same address range may be set by the QKD-A device and the QKD-B device through the negotiation. The same address range may also be determined, based on an address range used by the two devices to perform a storage operation in a previous time, in an accumulation mechanism in accordance with the number of quantum keys acquired by this negotiation, as long as the mechanism can ensure that the two devices store the quantum keys in the same address range.

In some embodiments, in the process of storing the quantum keys, an abnormality such as a write data error may occur to the QKD-A device or the QKD-B device, causing the quantum keys stored in the same address range by the QKD-A device and the QKD-B device to mismatch. In one embodiment, the QKD-A device and the QKD-B device may verify consistency of the quantum keys stored in the same address range by the two devices, and take the quantum keys that pass consistency verification as quantum keys that can be sent to the key management devices.

In some embodiments, hash values of the quantum keys stored in the same address range by the two parties can be compared. Consistency verification of quantum keys between the QKD devices or the QKS devices can be performed with the same method described below with respect to step 304.

In some embodiments, it may be necessary to transmit the hash values of the quantum keys through network by using the above-described verification mechanism. If the hash values are intercepted by malicious hackers, security of the quantum keys may be breached. In light of this threat, verification based on a corresponding relationship between key labels and storage positions may be performed, for verifying consistency of the quantum keys between the QKD devices and/or between the QKS devices.

In order to implement the implementation mechanism described in the preceding paragraph, the quantum keys negotiated and acquired by the QKD devices of the sender and the receiver through a quantum key distribution protocol may have a corresponding key label sequence, and each key label in the key label sequence may be a unique identification of a different quantum bit in the quantum keys. Moreover, the QKD devices of the sender and the receiver, after storing the quantum keys by using the same address range, may establish a one-to-one corresponding relationship between a storage address of each quantum bit and a key label.

In some embodiments, timestamp information of each quantum bit can be used as its key label, and the timestamp information of each quantum bit can be acquired when the QKD devices of the sender and the receiver negotiate the quantum keys. For example, the process of negotiating the quantum keys performed by using a BB84 protocol may be based on clock synchronization, and each quantum key obtained through negotiation may have unique corresponding timestamp information. In addition, the timestamp information of each quantum bit may be different. Therefore, timestamp information of the quantum bits can be used as their key labels.

Consistency verification of quantum keys between the QKD devices or the QKS devices can be performed with the same method based on key labels, described below with reference to step 304.

If the QKD-B device determines, through the verification, that the quantum keys stored in the same address range by the two parties are different, the QKD-B device can transmit to the QKD-A device an acknowledgment indicating that verification is not passed, and the QKD-A device and the QKD-B device can clear the quantum keys stored in the same address range and negotiate quantum keys again through a quantum key distribution protocol. In some embodiments, the QKD-A device and the QKD-B device may not clear the quantum keys stored in the same address range, but may cover the quantum keys with new quantum keys acquired through a next quantum key negotiation and may write the new quantum keys in the same address range.

As described above, the QKD devices may perform consistency verification each time after storing acquired quantum keys, and send quantum keys that pass the consistency verification to the corresponding QKS devices. If, subsequently, the QKS devices of the sender and the receiver determine that the quantum keys acquired from the corresponding QKD devices do not match with each other, the mismatch can be caused by a network transmission abnormality, such as, packet loss. Thus, the QKS devices of the sender and the receiver can acquire quantum keys from the corresponding QKD devices again, without emptying all quantum keys stored in the QKD-A device and the QKD-B device, e.g., by rebooting. This method can reduce a waste of quantum keys that have been acquired by the QKD devices.

In some embodiments, to further improve consistency of the quantum keys stored by the QKD-A device and the QKD-B device, consistency of the quantum keys stored in the same address range by the QKD-A device and the QKD-B device can be regularly verified in accordance with a preset time interval.

In addition, the QKD-A device and the QKD-B device, after acquiring quantum keys through a quantum key negotiation process and storing the quantum keys in the same address range, may further send a notification to the corresponding QKS devices, for the QKS devices to use as a reference when sending key acquisition requests. The notification may include the number of quantum keys currently stored.

Step 302. The key management devices of the sender and the receiver send the key acquisition requests separately to the respective quantum key distribution devices.

The QKS-A device and the QKS-B device can negotiate length information of the quantum keys acquired from respective QKD devices in advance, and send the key acquisition requests that carry the length information to the respective QKD devices.

Step 303. The quantum key distribution devices of the sender and the receiver send the quantum keys stored in the same address range to the corresponding key management devices.

After receiving the key acquisition requests and in accordance with the key length information carried in the requests, the QKD-A device and the QKD-B device can determine an address range from which quantum keys are extracted for the QKS devices through negotiation, and can then extract the quantum keys in accordance with the negotiated address range and send the quantum keys to the corresponding key management devices.

If, in step 301, a consistency verification of quantum keys is performed between the QKD-A device and the QKD-B device, in this step, the QKD-A device and the QKD-B device can determine an address range from which quantum keys that pass the consistency verification are extracted for the corresponding QKS devices through negotiation, and can then extract the quantum keys in accordance with the same address range negotiated and send the quantum keys to the corresponding QKS devices.

If the QKS-A device and the QKS-B device, in step 304, need to perform a consistency verification of quantum keys through key labels, in this step, the QKD-A device and the QKD-B device, while sending the quantum keys to the corresponding QKS devices, may also send a key label sequence of the quantum keys.

Step 304. The key management devices of the sender and the receiver store the received quantum keys in the same address range, and verify consistency of the quantum keys stored in the same address range.

The QKS-A device and the QKS-B device may store the received quantum keys in the same address range. The same address range may be set by the QKS-A device and the QKS-B device through a negotiation. Based on the address range used by the two parties to perform a storage operation in the previous time, the QKS-A device and the QKS-B device may also determine the same address range in an accumulation mechanism in accordance with the number of quantum keys acquired by this negotiation, as long as the two parties store the quantum keys in the same address range.

Verifying, by the QKS-A device and the QKS-B device, consistency of the quantum keys stored in the same address range by the two parties can be implemented by many mechanisms, and several exemplary mechanisms are listed below.

1) The consistency verification can be implemented by comparing hash values of the quantum keys stored in the same address range by the two parties.

In some embodiments, the QKS-A device may calculate a hash value of a quantum key stored in the address range by using a preset hash algorithm, encrypt the hash value and information of the address range by using the quantum keys that pass consistency verification and that acquired by the two parties in the previous time, and send the encrypted information to the other party. The QKS-B device, after receiving the information sent by the QKS-A device, may acquire the information of the address range after performing decryption by using the corresponding keys, calculate a hash value of quantum keys stored in a local corresponding address range by using the preset hash algorithm, and determine whether the hash value obtained through the calculation is the same as the received hash value. If the determination indicates that they are the same, the QKS-B device may return a verification passing acknowledgement to the QKS-A, and otherwise, return an acknowledgment indicating that the verification is not passed.

In some embodiments, the information of the address range sent by the QKS-A device to the QKS-B device may include a head address and a tail address of the address range, and may also include a head address and a range length, or a head address and the length of quantum keys of which the consistency is to be verified, as long as the QKS-B device can determine a specific address range based on the received information. The preset hash algorithm may include SHA-1, SHA-2, or SHA-3, and other possible hash algorithms, as long as the QKS-A device and the QKS-B device use the same hash algorithm. For security of the transmission process, the QKS-A device may encrypt information to be sent by using the quantum keys that are acquired by the QKS-A device and the QKS-B device in the previous time and that pass consistency verification. If the consistency verification is performed for the first time, a shared key preset by the two parties can be used for encryption, and the corresponding QKS-B device may also use the shared key preset for decryption. In some embodiments, the QKS-A device may initiate a verification process, and the QKS-B device may return a verification acknowledgement. In some other embodiments, the QKS-B device may initiate the verification process. Various changes about the implementation mechanisms described above may also be suitable for embodiments described below.

2) The consistency verification can be implemented by a first mechanism based on a corresponding relationship between key labels and storage positions of quantum bits.

In order to avoid the potential safety issues caused by the hash values of quantum keys to be verified being intercepted in the process of transmission, a implementation mechanism of performing consistency verification may include using a characteristic that a key label can uniquely identify a quantum bit and a corresponding relationship between key labels and storage positions. By use of this implementation mechanism, information acquired from corresponding QKD devices by the QKS-A device and the QKS-B device may not only include quantum keys, but also a key label sequence of the quantum keys, and each key label in the key label sequence may be a unique identification of a quantum bit in the quantum keys. The QKS-A device and the QKS-B device, after storing received quantum keys in the same address range, may establish a one-to-one corresponding relationship between a storage address of each quantum bit and a key label.

A key label sequence of a quantum key to be verified on the side of the QKS-A device can be denoted as Lab1, an address sequence including the storage addresses of all quantum bits in the quantum key to be verified can be denoted as Locate1, hash( ) may represent a preset hash algorithm, and information in { } may represent encrypted data. The QKS-A device and the QKS-B device can verify consistency of the quantum keys stored in the same address range by the two parties in a mechanism as follows:

the QKS-A device may calculate a hash value of Lab1 by using a preset hash algorithm, encrypt the hash value and the Locate1 by using the quantum keys acquired by the two parties in the previous time and that pass consistency verification, and send encrypted information to the QKS-B device, i.e., the QKS-A device may send the following information to the QKS-B device: Verify-A={hash(Lab1), Locate1}; and the QKS-B device, after using a corresponding key to decrypt the received information, may acquire a hash value and an address sequence, acquire a corresponding key label sequence locally in accordance with the address sequence, calculates a hash value of the acquired key label sequence by using the preset hash algorithm, determine whether the hash value obtained through calculation is the same as the received hash value, return a verification passing acknowledgement to the QKS-A device if they are the same, and return an acknowledgment indicating that the verification is not passed if they are not the same.

In some embodiments, the above mechanism can be adjusted. For example, the QKS-A device may send Verify-A={hash(Locate1), Lab1} to the QKS-B device, and correspondingly, the QKS-B device may acquire a corresponding address sequence locally in accordance with the received key label sequence, and determine whether the consistency verification is passed by using the same mechanism of determining and comparing hash values.

3) The consistency verification can be implemented by a second mechanism based on a corresponding relationship between key labels and storage positions of quantum bits.

The above may illustrate one mechanism of performing consistency verification based on a corresponding relationship between key labels and storage positions of quantum bits, and another mechanism, which may still be based on the description mechanism agreed in the above mechanism, of performing consistency verification based on the above corresponding relationship can be illustrated as follows:

the QKS-A device may calculate a hash value of a character string formed by concatenation of the Lab1 and the Locate1 by using a preset hash algorithm, encrypt the hash value and the Locate1 by using the quantum keys acquired by the two parties in the previous time and that pass consistency verification, and send encrypted information to the QKS-B device, e.g., the QKS-A device may send the following information to the QKS-B device: Verify-A={hash(Lab1, Locate1), Locate1}; and the QKS-B device, after using a corresponding key to decrypt the received information, may acquire a hash value and an address sequence, acquire a corresponding key label sequence locally in accordance with the address sequence, calculate a hash value of a character string formed by concatenation of the key label sequence and the address sequence by using the preset hash algorithm, determine whether the hash value obtained through calculation is the same as the received hash value, return a verification passing acknowledgement to the QKS-A device if they are the same, and return an acknowledgment indicating that the verification is not passed if they are not the same.

In some embodiments, the above mechanism can be adjusted. For example, the QKS-A device may send Verify-A={hash(Lab1, Locate1), Lab1} to the QKS-B device, and correspondingly, the QKS-B device may acquire a corresponding address sequence locally in accordance with the received key label sequence, and determine whether consistency verification is passed by using the same mechanism of determining and comparing hash values.

Three mechanisms of verifying consistency of the quantum keys stored in the same address range by the QKS-A device and the QKS-B device have been described above. The first mechanism of the three can be relatively simple and does not need to use key labels, but may have certain potential safety hazard. The second and third mechanisms can be relatively more complicated, and may establish a corresponding relationship between key labels and storage positions of quantum bits, and thus, it may not be necessary to transmit quantum key information on the network. Instead, whether the address sequences of the quantum bits stored by the devices of the two parties and the corresponding key label sequences are both the same can be verified. If they are the same, it can prove that the quantum keys stored in the same address range by the devices of the two parties are the same, i.e., consistency verification is passed.

If the QKS-A device and the QKS-B device, after performing the consistency verification, find that the quantum keys stored in the same address range by the two parties are not the same, i.e., the quantum keys fail to pass the consistency verification, the QKS-A device and the QKS-B device can clear the quantum keys stored in the same address range, and perform step 302 to acquire quantum keys from respective QKD devices once again. In some embodiments, the QKS-A and the QKS-B device may not clear the quantum keys stored in the same address range, but cover the quantum keys with new quantum keys acquired from the respective QKD devices during a second time and write the new quantum keys in the same address range.

The QKS devices of the sender and the receiver, each time after storing the quantum keys acquired from the respective QKD devices, may perform consistency verification and, each time when quantum keys are output to the corresponding data devices, may select quantum keys from the quantum keys that pass the consistency verification. If, subsequently, the data devices of the sender and the receiver determine that the quantum keys acquired from the corresponding QKS-A device are not consistent with each other, the inconsistency may be caused by a network transmission abnormality, for example, packet losses. Thus, the data devices of the sender and the receiver can acquire quantum keys from the corresponding QKS devices once again without emptying all quantum keys stored in the QKS-A device and the QKS-B device in a mechanism such as reboot, to avoid wasting the acquired quantum keys.

The three mechanisms of verifying consistency of quantum keys for the QKS-A and the QKS-B device may also be applied in consistency verification of quantum keys between the QKD-A and the QKD-B device. In some embodiments, other mechanisms different from the above mechanisms may also be adopted, as long as the mechanisms can verify consistency of quantum keys stored in the same address range by devices of the two parties, and do not depart from the core of the disclosure and will fall within the scope of the disclosure.

Step 305. The data devices of the sender and the receiver send key acquisition requests separately to the respective key management devices.

The data device A and the data device B can negotiate in advance to request for acquiring lengths of the quantum keys from the QKS devices, and send quantum key acquisition requests to the respective QKS devices, the request carrying information of the lengths.

Step 306. The key management devices of the sender and the receiver, after receiving the key acquisition requests, select quantum keys stored in the same address range from quantum keys that pass consistency verification, and send the quantum keys to the corresponding data devices.

The QKS-A device and the QKS-B device, after receiving the key acquisition requests sent by the corresponding data devices, can determine, based on key length information carried in the request, an address range from which the quantum keys that pass consistency verification are output to the data devices, through a negotiation, and send quantum keys in the negotiated same address range to the corresponding data devices.

The QKS-A device and the QKS-B device may output quantum keys that pass consistency verification to respective corresponding data devices, so that the data device A and the data device B can perform corresponding encryption and decryption operations by using the received quantum keys on data for secret transmission.

In some embodiments, in consideration of possible packet losses in the process of transmission between the QKS devices and the corresponding data devices, consistency verification of quantum keys between data devices may be performed. For example, after the QKS devices of the sender and the receiver send quantum keys to the corresponding data devices, the data device A and the data device B may verify consistency of acquired quantum keys and use quantum keys that pass the consistency verification as keys for the data encryption and decryption operations.

Verifying, by the data device A and the data device B, consistency of quantum keys acquired by the two parties may be implemented be many mechanisms, and two of them are described below.

1) Consistency verification is implemented by comparing hash values of the quantum keys acquired by the two parties.

The data device A may calculate a hash value of the quantum keys acquired by using a preset hash algorithm, encrypt the hash value using the quantum keys acquired by the two parties in the previous time and that pass consistency verification, and send encrypted information to the data device B. The data device B, after decrypting the received information by using a corresponding key, may calculate a hash value of locally acquired quantum keys by using the preset hash algorithm, determine whether the hash value obtained through calculation is the same as the received hash value, return an acknowledgment indicating that the verification is passed to the data device A if they are the same, and return an acknowledgment indicating that the verification is not passed if they are not the same.

2) Consistency verification is implemented by using a corresponding relationship between quantum keys and key label sequences.

By this verification mechanism, the information sent by the QKS devices of the sender and the receiver to the corresponding data devices may not only include quantum keys, but also a key label sequence of the quantum keys. A quantum key received by the data device A can be denoted as Key1, a corresponding key label sequence can be denoted as Lab1, hash( ) may represent a preset hash algorithm, and information in { } may be encrypted data. The data device A and the data device B, after receiving quantum keys and key label sequences sent by the respective QKS devices, may perform the following operations to implement consistency verification of the quantum keys:

the data device A may calculate a hash value of a character string formed by concatenation of the quantum key Key1 and the key label sequence Lab1 by using a preset hash algorithm, encrypt the hash value and the key label sequence Lab1 by using the quantum keys acquired by the two parties in the previous time and that pass consistency verification, and send encrypted information to the data device B, i.e., the data device A may send the following information to the data device B: Verify-A={hash(Key1, Lab1), Lab1}; and the data device B, after using a corresponding key to decrypt the received information, may acquire a corresponding quantum key locally in accordance with the acquired key label sequence, calculate a hash value of a character string formed by concatenation of the quantum key and the key label sequence by using the preset hash algorithm, determine whether the hash value obtained through calculation is the same as the received hash value, return a verification passing acknowledgement to the data device A if they are the same, and return an acknowledgment indicating that the verification is not passed if they are not the same.

If the data device A and the data device B, after performing the consistency verification, determine that the quantum keys acquired by the two parties are not the same, i.e., the quantum keys fail to pass the consistency verification, the data device A and the data device B can give up the quantum keys acquired this time, and perform step 305 to send key acquisition requests to the respective QKS devices separately again.

Since the quantum keys output to the data devices by the QKS devices are all quantum keys stored by the QKS devices and have passed consistency verification, and if the quantum keys acquired by the data devices of the sender and the receiver are not consistent with each other, it can be caused by a network transmission abnormality, for example, packet loss. In this case, it may not be necessary to empty all quantum keys stored in the QKS-A device and the QKS-B device in a mechanism such as reboot, to avoid wasting acquired quantum keys.

The flow of using a real-time acquisition mechanism has been described through step 301 to step 306. To improve security, all data interaction in a classical channel in the above processing flow can be carried out based on HTTPS connection, and digital certificates used by the various devices participating in the interaction in the authentication process can be issued by a trusted third party. Before each two devices carry out data interaction, two-way identity authentication can be performed in advance, for example, in a mechanism such as using a preset digital certificate, and the process of data interaction may begin after the two parties both pass the identity authentication of the opposite party.

Figure 5:
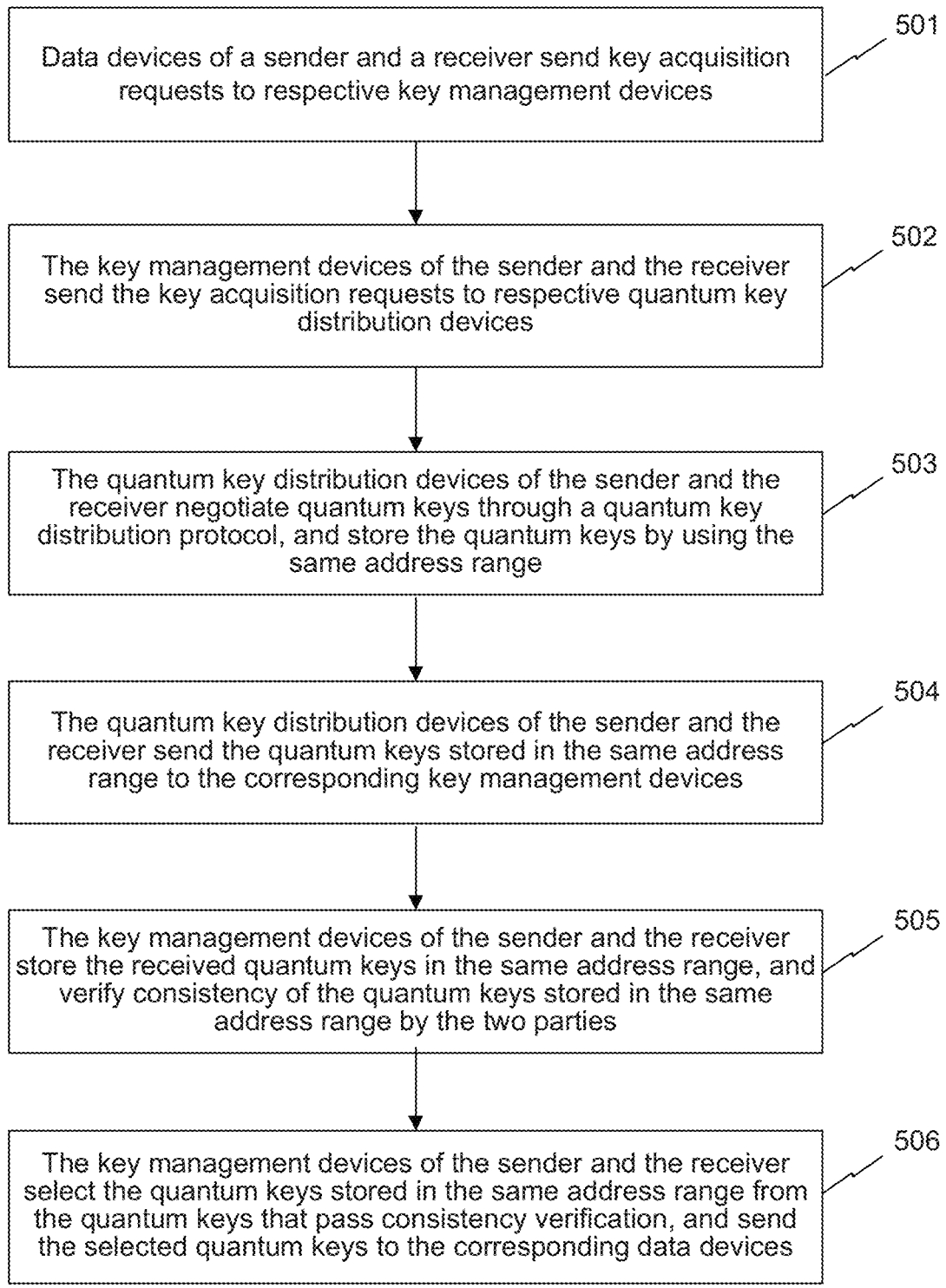
FIG. 5 is a flow diagram illustrating a quantum key output method based on a pre-acquiring mechanism, according to an exemplary embodiment.
Figure 6:
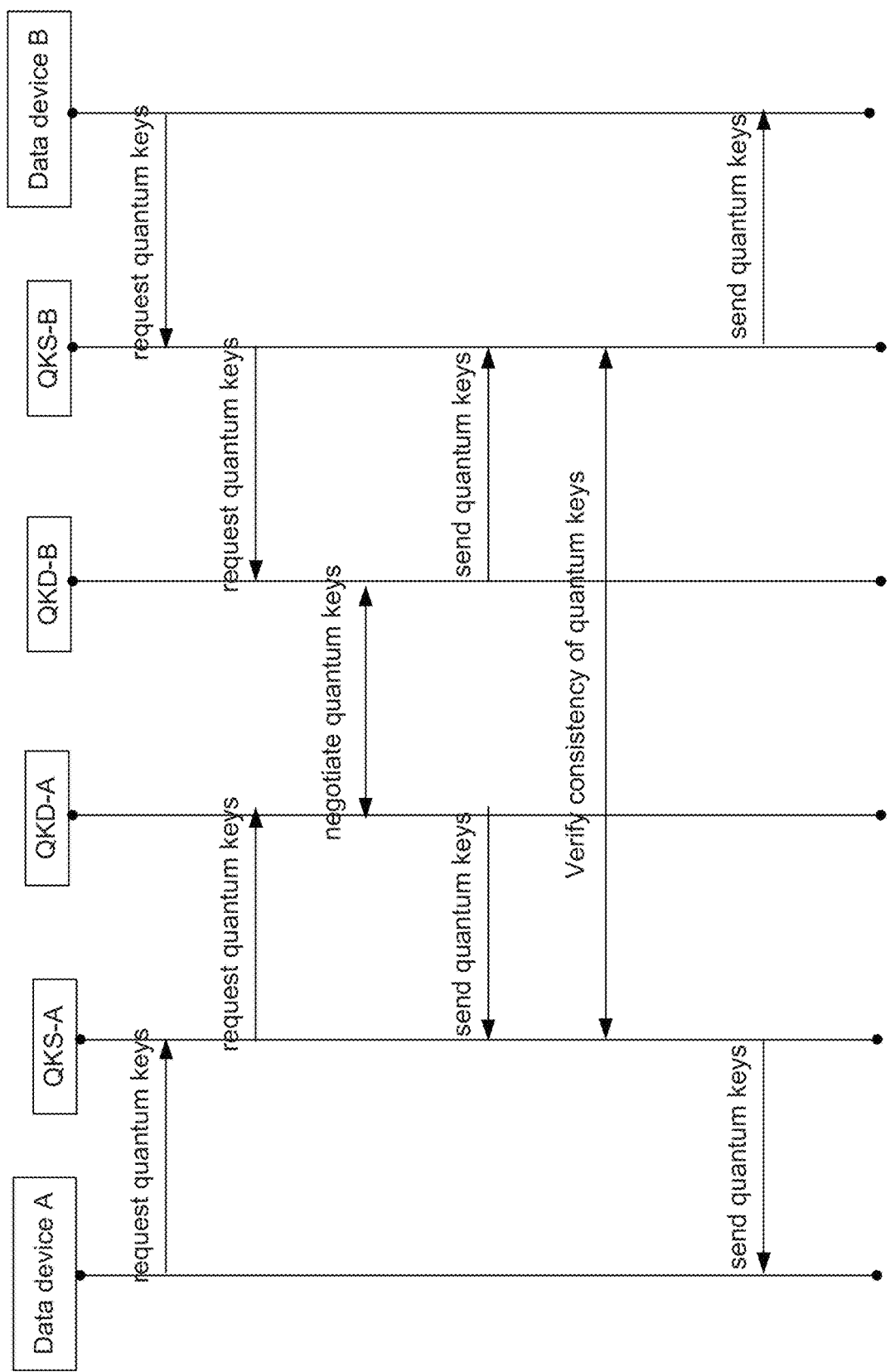
FIG. 6 is a flow diagram illustrating interactions among various devices based on the pre-acquiring mechanism, according to an exemplary embodiment.

A real-time acquisition mechanism has been described, and the following describes implementing a pre-acquiring mechanism. FIG. 5 is a flow diagram illustrating a quantum key output method 500 based on a pre-acquiring mechanism, according to an exemplary embodiment. Correspondingly, FIG. 6 provides a flow diagram illustrating interactions among various devices based on the pre-acquiring mechanism, according to an exemplary embodiment. Method 500 may be implemented by a non-transitory computer-readable storage medium storing one or more programs, the one or more programs comprising instructions which, when executed by a processor of a computer system, cause the computer system to perform method 500. Method 500 may include the following steps:

Step 501. Data devices of a sender and a receiver send key acquisition requests separately to respective key management devices.

Step 502. The key management devices of the sender and the receiver send the key acquisition requests separately to respective quantum key distribution devices.

Since the QKS devices of the sender and the receiver do not store quantum keys that pass consistency verification in advance, the QKS devices may forward the received requests to the respective QKD devices.

Step 503. The quantum key distribution devices of the sender and the receiver negotiate quantum keys through a quantum key distribution protocol, and store the quantum keys by using the same address range.

Step 504. The quantum key distribution devices of the sender and the receiver send the quantum keys stored in the same address range to the corresponding key management devices.

Step 505. The key management devices of the sender and the receiver store the received quantum keys in the same address range, and verify consistency of the quantum keys stored in the same address range by the two parties.

Step 506. The key management devices of the sender and the receiver select the quantum keys stored in the same address range from the quantum keys that pass consistency verification, and send the selected quantum keys to the corresponding data devices.

The difference between the pre-acquiring mechanism and the real-time acquisition mechanism may include interaction processes between various devices. In the pre-acquiring mechanism, the QKS devices of the sender and the receiver may not pre-store quantum keys that pass consistency verification like the real-time acquisition mechanism, but may, after receiving the key acquisition requests of the data devices, acquire quantum keys from the corresponding QKD devices, perform consistency verification of the quantum keys, and then send quantum keys that pass the consistency verification to the data devices.

In some embodiments, the pre-acquiring mechanism may share many similar steps with the real-time acquisition mechanism, i.e., the QKS devices of the sender and the receiver need to verify consistency of the quantum keys stored in the same address range by the two parties, to ensure that keys output to the data devices match with each other. Further, the QKD devices of the sender and the receiver may also perform consistency verifications on the quantum keys stored, and the data devices of the sender and the receiver may also perform consistency verifications on the quantum keys received. Exemplary embodiments can be related to the related description of the real-time acquisition mechanism.

In some embodiments, one of the real-time acquisition mechanism and the pre-acquiring mechanism can be used, or the two mechanisms can be combined for implementation. For example, the QKS devices of the sender and the receiver can generally pre-store quantum keys that pass consistency verification and output quantum keys in accordance with demands of the corresponding data devices. When the data devices have a demand for a greater quantity of the quantum keys, the QKS devices of the sender and the receiver can change to the pre-acquiring mechanism if determining that there are no pre-stored keys available for output.

The quantum key output method, as the key management devices of the sender and the receiver perform consistency verification on quantum keys stored in the same address range, can improve synchronicity and usefulness of quantum keys output by a quantum key output system, i.e., the quantum keys output to the data devices can all be the same and matching, thereby providing security for correct execution of the data encryption and decryption process. In particular, even if the quantum keys acquired by the sender and the receiver of the data do not matching (for example, caused by a poor network transmission), it is not necessary to empty quantum keys stored by the key management devices of the sender and the receiver, so that wasting quantum key resources can be prevented.

Figure 7:
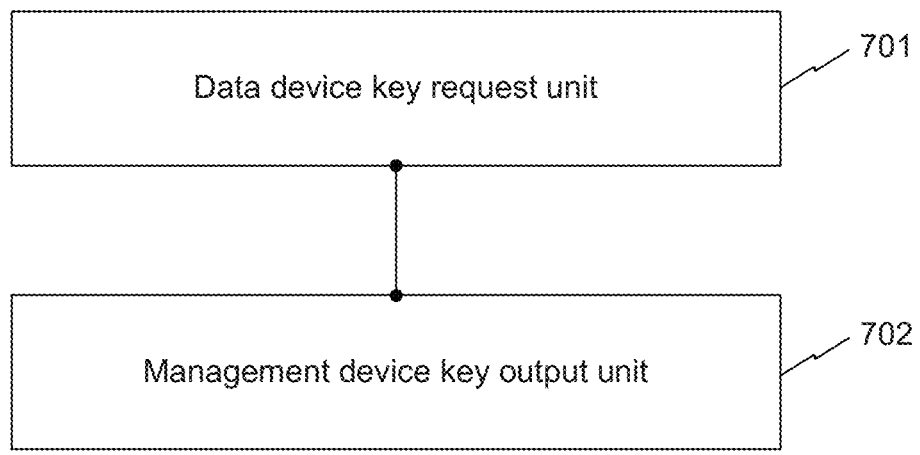
FIG. 7 is a block diagram illustrating a quantum key output apparatus, according to an exemplary embodiment.

FIG. 7 is a block diagram illustrating a quantum key output apparatus 700, according to an exemplary embodiment. References can be made to the corresponding description in the embodiments described above. The apparatus embodiment described below is merely schematic.

Apparatus 700 may include: a data device key request unit 701 configured to send key acquisition requests separately to respective key management devices. The data device key request unit 701 may be implemented in the data devices of a sender and a receiver. Apparatus 700 may further include a management device key output unit 702 configured to send, after receiving the key acquisition requests, quantum keys acquired from corresponding quantum key distribution devices and that pass consistency verification performed by the key management devices of the sender and the receiver to the corresponding data devices, to allow the corresponding data devices to perform data encryption and decryption. The management device key output unit 702 may be implemented in the key management devices of the sender and the receiver.

Apparatus 700 may also include a distribution device key negotiation and verification unit.

The distribution device key verification unit may be configured to, after quantum keys negotiated and acquired through a quantum key distribution protocol are stored in the same address range, verify consistency of the quantum keys stored in the same address range by the two parties, and take quantum keys that pass consistency verification as quantum keys for the corresponding key management devices to acquire. The distribution device key verification unit may be implemented in the quantum key distribution devices corresponding to the key management devices of the sender and the receiver.

Apparatus 700 may also include a distribution device key negotiation unit, a management device key request unit, a distribution device key sending unit, and a management device key verification unit. The negotiation unit, request unit, sending unit, and verification unit may be started before the data device key request unit starts to operate.

The distribution device key negotiation unit may be configured to negotiate quantum keys through a quantum key distribution protocol, and store, by the quantum key distribution devices of the sender and the receiver, the quantum keys by using the same address range. The distribution device key negotiation unit may be implemented in the quantum key distribution devices of the sender and the receiver.

The management device key request unit may be configured to send key acquisition requests to the respective quantum key distribution devices. The management device key request unit may be implemented in the key management devices of the sender and the receiver.

The distribution device key sending unit may be configured to send the quantum keys stored in the same address range to the corresponding key management devices. The distribution device key sending unit may be implemented in the quantum key distribution devices of the sender and the receiver, The management device key verification unit may be configured to store the received quantum keys in the same address range, and verify consistency of the quantum keys stored in the same address range by the two parties. The management device key verification unit may be implemented in the key management devices of the sender and the receiver.

Correspondingly, the management device key output unit may be configured to, after the key management devices of the sender and the receiver receive the key acquisition requests, select the quantum keys stored in the same address range from the quantum keys that pass consistency verification, and send the selected quantum keys to the corresponding data devices.

Apparatus 700 may also include:

a management device key request forwarding unit configured to, after the data device key request unit receives the key acquisition requests, send the key acquisition requests separately to the respective quantum key distribution devices (the management device key may be implemented in the key management devices of the sender and the receiver).

the distribution device key negotiation unit configured to negotiate quantum keys through a quantum key distribution protocol, and store the quantum keys by using the same address range (the distribution device key negotiation unit may be implemented in the quantum key distribution devices of the sender and the receiver).

a distribution device key sending unit configured to send the quantum keys stored in the same address range to the corresponding key management devices (the distribution device key sending unit may be implemented in the quantum key distribution devices of the sender and the receiver), and a management device key verification unit configured to store the received quantum keys in the same address range, and verify consistency of the quantum keys stored in the same address range by the two parties. The management device key verification unit may be implemented in the key management devices of the sender and the receiver.

Correspondingly, the management device key output unit may be configured to select the quantum keys stored in the same address range from the quantum keys that pass consistency verification, and send the selected quantum keys to the corresponding data devices. The management device key output unit may be implemented in the key management devices of the sender and the receiver.

Apparatus 700 may also include:

a management device key clearing unit configured to, when a verification result of the management device key verification unit is that the verification is not passed, clear the verified quantum keys stored in the same address range, and trigger the unit to send key acquisition requests to the respective quantum key distribution devices to operate. The management device key clearing unit may be implemented in the key management devices of the sender and the receiver.

Apparatus 700 may also include:

a distribution device key verification unit configured to, after the distribution device key negotiation unit completes the process of negotiating quantum keys and stores the quantum keys by using the same address range, verify consistency of the quantum keys stored in the same address range by the two parties, and take quantum keys that pass consistency verification as quantum keys that can be sent to the key management devices. The distribution device key verification unit may be implemented in the quantum key distribution devices of the sender and the receiver.

Apparatus 700 may also include:

a distribution device key clearing unit configured to, when a verification result of the distribution device key verification unit is that the verification is not passed, clear the verified quantum keys stored in the same address range, and trigger the distribution device key negotiation unit to operate. The distribution device key clearing unit may be implemented in the quantum key distribution devices of the sender and the receiver.

The distribution device key verification unit and the management device key verification unit may respectively include a verification request subunit and a verification execution subunit.

The verification request subunit may be configured to, calculate a hash value of quantum keys stored in the address range by using a preset hash algorithm, encrypt the hash value and information of the address range by using the quantum keys acquired by the devices of the two parties participating in verification in the previous time and that pass consistency verification, and send the encrypted information to the device of the other party participating in verification. The verification request subunit may be implemented in the device of one party participating in verification.

The verification execution subunit may be configured to, after the device of the other party decrypts the received information by using a corresponding key, acquire the information of the address range, calculate a hash value of quantum keys stored in a local corresponding address range by using the preset hash algorithm, determine whether the hash value obtained through calculation is the same as the received hash value, return a verification passing acknowledgement to the device of the opposite party participating in verification if they are the same, and return an acknowledgment indicating that the verification is not passed if they are not the same.

Apparatus 700 may also include:

a data device key verification unit configured to, after the management device key output unit sends the quantum keys to the corresponding data devices, verify consistency of the received quantum keys, and take quantum keys that pass consistency verification as keys used by performing data encryption and decryption operations. The data device key verification unit may be implemented in the data devices of the sender and the receiver.

The quantum keys negotiated and acquired by the distribution device key negotiation unit through a quantum key distribution protocol may have a corresponding key label sequence.

Correspondingly, in addition to including body subunits that implement functions, the distribution device key negotiation unit may further includes a mapping relationship establishment subunit, in which the mapping relationship establishment subunit may be configured to establish a one-to-one corresponding relationship between a storage address of each quantum bit and a key label.

The information sent to the management device key verification unit by the distribution device key sending unit may not only include quantum keys, but also a key label sequence corresponding to the quantum keys.

In addition to including a storage subunit and a management device key verification subunit, the management device key verification unit may also include a mapping relationship establishment subunit. The storage subunit may be configured to store the received quantum keys in the same address range. The mapping relationship establishment subunit may be configured to establish a one-to-one corresponding relationship between a storage address of each quantum bit and a key label, and trigger the management device key verification subunit to operate. The management device key verification subunit may be configured to verify consistency of quantum keys stored in the same address range by the two parties. The storage subunit may be implemented in the key management devices of the sender and the receiver.

The distribution device key verification unit and the management device key verification subunit may respectively include a label verification request subunit and a label verification execution subunit.

The label verification request subunit may be configured to calculate a hash value of a character string formed by concatenation of the key label sequence of the quantum keys and an address sequence made up of the storage address of each quantum bit in the quantum keys by using a preset hash algorithm, encrypt the hash value and the address sequence or encrypt the hash value and the key label sequence by using the quantum keys acquired by the devices of the two parties participating in verification in the previous time and that pass consistency verification, and send encrypted information to the device of the other party participating in verification. The label verification request subunit may be implemented in the device of one party participating in the verification process.

The label verification execution subunit may be configured to, after the device of the other party receives the encrypted information, use a corresponding key for decryption, acquire a corresponding key label sequence locally in accordance with an extracted address sequence or acquire a corresponding address sequence locally in accordance with an extracted key label sequence, calculate a hash value of a character string formed by concatenation of the key label sequence and the address sequence by using the preset hash algorithm, determine whether the hash value obtained through calculation is the same as the received hash value, return a verification passing acknowledgement to the device of the opposite party participating in verification if they are the same, and return an acknowledgment indicating that the verification is not passed if they are not the same.

Figure 8:
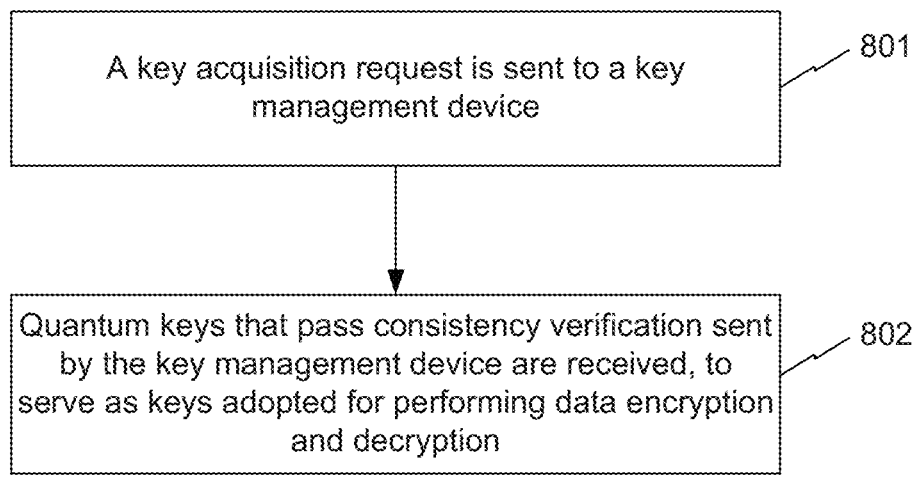
FIG. 8 is a flow diagram illustrating a quantum key acquisition method, according to an exemplary embodiment.

A quantum key acquisition method implemented on a data device that encrypts and decrypts data by using quantum keys is disclosed. FIG. 8 is a flow diagram illustrating a quantum key acquisition method 800, according to an exemplary embodiment. Parts of this embodiment of which contents are similar to those of the embodiments described above are no longer repeated, and the following focuses on the differences. Method 800 may be implemented by a non-transitory computer-readable storage medium storing one or more programs, the one or more programs comprising instructions which, when executed by a processor of a computer system, cause the computer system to perform method 800. Method 800 may include:

Step 801. A key acquisition request is sent to a key management device.

Step 802. Quantum keys that pass consistency verification and that sent by the key management device are received, for performing data encryption and decryption.

After the quantum keys that pass consistency verification and sent by the key management device are received, consistency of acquired quantum keys and quantum keys acquired by a peer data device can be further verified, and quantum keys that pass the consistency verification can be used as keys for performing data encryption and decryption.

If it is found through the verification process that the acquired quantum keys are not consistent with the quantum keys acquired by the peer data device, step 801 can be performed to send a quantum key acquisition request to the key management device once again.

Figure 9:
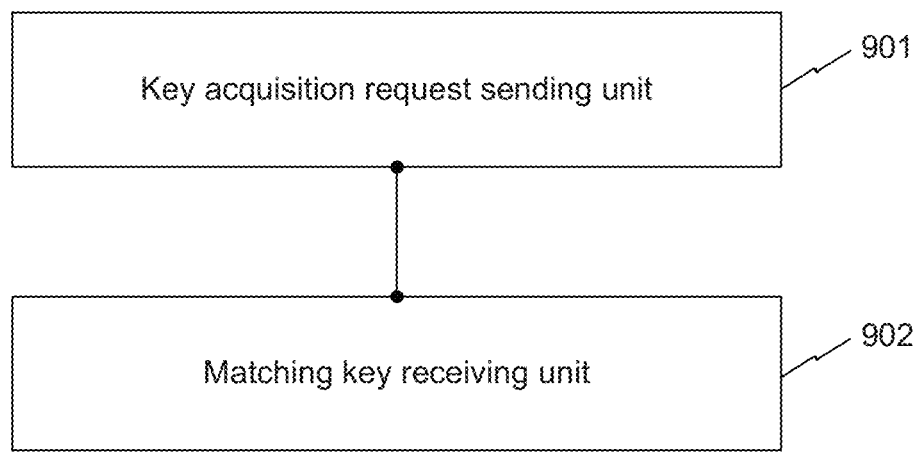
FIG. 9 is a block diagram illustrating a quantum key acquisition apparatus, according to an exemplary embodiment.

In view of the above, a quantum key acquisition method is disclosed, and correspondingly, a quantum key acquisition apparatus is disclosed below. FIG. 9 is a block diagram illustrating a quantum key acquisition apparatus 900, according to an exemplary embodiment. Apparatus 900 described below is merely schematic.

Apparatus 900 can be deployed on a data device that encrypts and decrypts data by using quantum keys. Apparatus 900 may include: a key acquisition request sending unit 901 configured to send a key acquisition request to a key management device; and a matching key receiving unit 902 configured to receive quantum keys that pass consistency verification sent by the key management device, to serve as keys adopted for performing data encryption and decryption.

Figure 10:
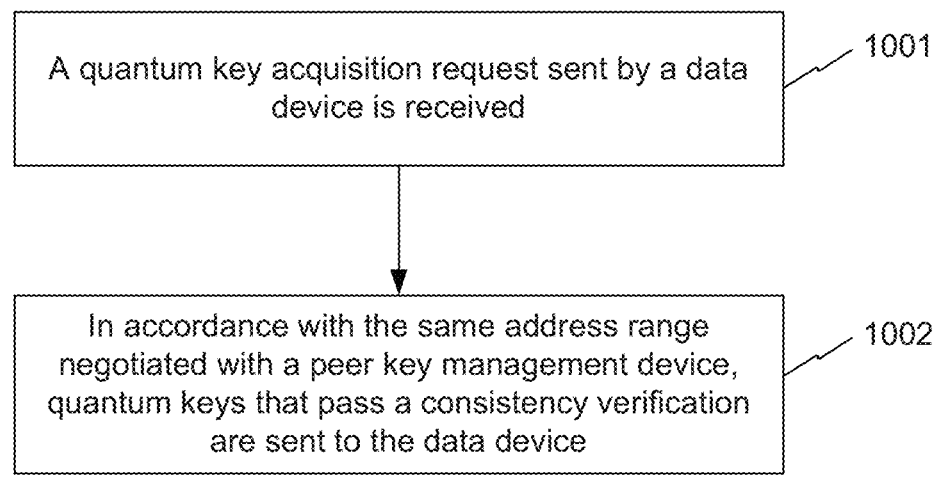
FIG. 10 is a flow diagram illustrating a quantum key storage and output method, according to an exemplary embodiment.

In addition, a quantum key storage and output method, implemented on a key management device that provides quantum keys for a data device, is disclosed. FIG. 10 is a flow diagram illustrating a quantum key storage and output method 1000, according to an exemplary embodiment. The parts of this embodiment similar to embodiments described above are no longer repeated, and the following focuses on their differences. Method 1000 may be implemented by a non-transitory computer-readable storage medium storing one or more programs, the one or more programs comprising instructions which, when executed by a processor of a computer system, cause the computer system to perform method 1000. Method 1000 may include:

Step 1001. A quantum key acquisition request sent by a data device is received.

If the mechanism of acquiring quantum keys in real time is adopted, the following operations can be performed prior to step 1001:

1) sending a key acquisition request to a quantum key distribution device;

2) receiving quantum keys sent by the quantum key distribution device, and storing the quantum keys by using an address range the same as that of the peer key management device; and 3) verifying consistency of the quantum keys stored in the address range and the quantum keys stored in the same address range by the peer key management device, and taking quantum keys that pass consistency verification as quantum keys that can be sent to the data device.

Step 1002. In accordance with the same address range negotiated with a peer key management device, quantum keys that pass consistency verification are sent to the data device.

If a mechanism of pre-acquiring quantum keys is adopted, the following operations can be performed after step 1001 and prior to step 1002:

1) sending the key acquisition request to a quantum key distribution device;

2) receiving quantum keys sent by the quantum key distribution device, and storing the quantum keys by using an address range the same as that of the peer key management device; and 3) verifying consistency of the quantum keys stored in the address range and the quantum keys stored in the same address range by the peer key management device.

In some embodiments, regardless of whether the real-time acquisition mechanism or the pre-acquiring mechanism is adopted, if, after consistency verification, it is found that the quantum keys stored in the address range are not consistent with the quantum keys stored in the same address range by the peer management device, the quantum keys stored in the address range may be cleared and key acquisition requests to the quantum key distribution devices may be sent once again.

Figure 11:
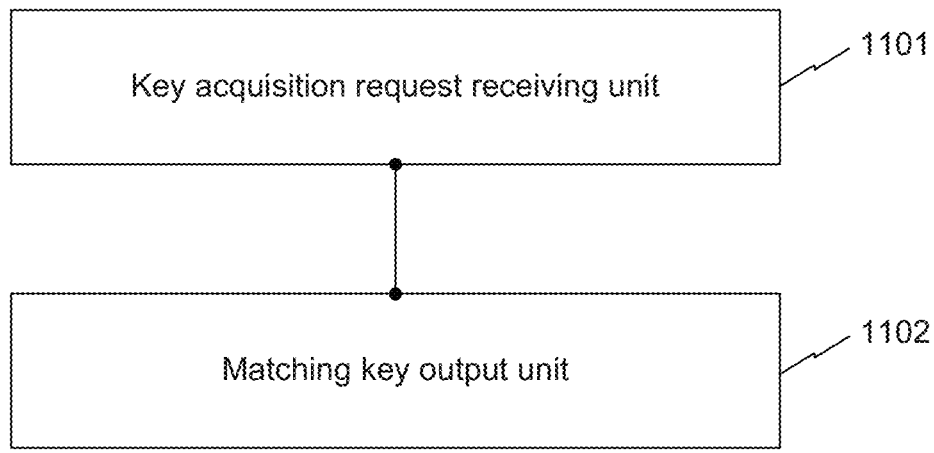
FIG. 11 is a block diagram illustrating a quantum key storage and output apparatus, according to an exemplary embodiment.

A quantum key storage and output method is disclosed, and correspondingly, a quantum key storage and output apparatus is disclosed below. FIG. 11 is a block diagram illustrating a quantum key storage and output apparatus 1100, according to an exemplary embodiment. Apparatus 1100 described below is merely schematic.

Apparatus 1100, deployed on a key management device that provides quantum keys for a data device, may include: a key acquisition request receiving unit 1101 configured to receive a quantum key acquisition request sent by a data device; and a matching key output unit 1102 configured to send, in accordance with the same address range negotiated with a peer key management device, quantum keys that pass consistency verification to the data device.

Figure 12:
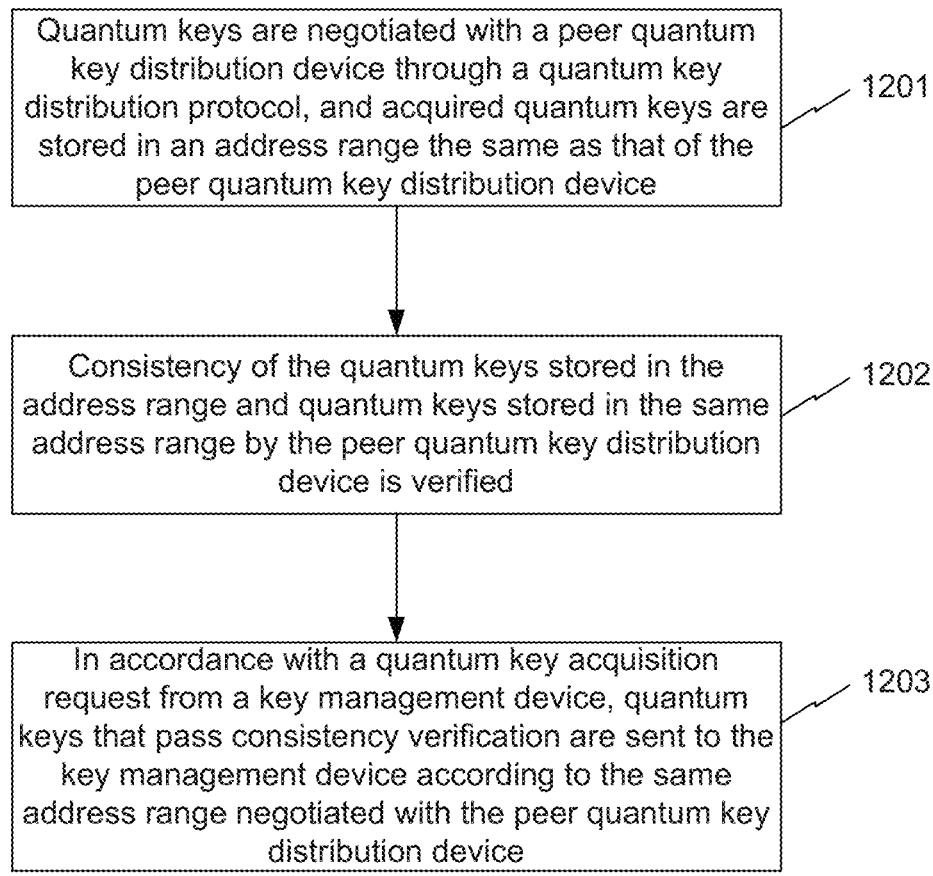
FIG. 12 is a flow diagram illustrating a quantum key distribution and storage method, according to an exemplary embodiment.

In addition, a quantum key distribution and storage method is disclosed, and the method may be implemented on a quantum key distribution device. FIG. 12 is a flow diagram illustrating a quantum key distribution and storage method 1200, according to an exemplary embodiment. The parts of this embodiment similar to embodiments described above are not repeated, and the following focuses on the differences. Method 1200 may be implemented by a non-transitory computer-readable storage medium storing one or more programs, the one or more programs comprising instructions which, when executed by a processor of a computer system, cause the computer system to perform method 1200. Method 1200 may include:

Step 1201. Quantum keys are negotiated with a peer quantum key distribution device through a quantum key distribution protocol, and acquired quantum keys are stored in an address range the same as that of the peer quantum key distribution device.

Step 1202. Consistency of the quantum keys stored in the address range and quantum keys stored in the same address range by the peer quantum key distribution device is verified.

Step 1203. In accordance with a quantum key acquisition request from a key management device, quantum keys that pass consistency verification are sent to the key management device according to the same address range negotiated with the peer quantum key distribution device.

If, after consistency verification is performed in step 1202, it is found that the quantum keys stored in the address range are not consistent with the quantum keys stored in the same address range by the peer quantum key distribution device, the quantum keys stored in the address range may be cleared and step 1201 may be performed.

If the mechanism of acquiring quantum keys in real time is adopted, the key acquisition request from the key management device may be received after step 1202. If the pre-acquiring mechanism is adopted, the request may be received prior to step 1201.

Figure 13:
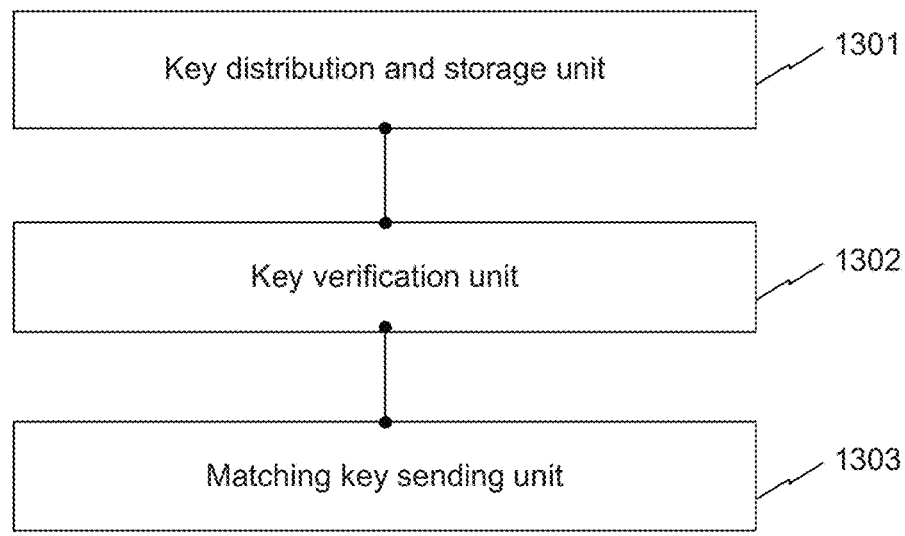
FIG. 13 is a block diagram illustrating a quantum key distribution and storage apparatus, according to an exemplary embodiment.

A quantum key distribution and storage method is disclosed, and correspondingly, a quantum key distribution and storage apparatus is disclosed. FIG. 13 is a block diagram illustrating a quantum key distribution and storage apparatus 1300, according to an exemplary embodiment. Apparatus 1300 described below is merely schematic.

Apparatus 1300 may be implemented on a quantum key distribution device and may include: a key distribution and storage unit 1301 configured to negotiate quantum keys with a peer quantum key distribution device through a quantum key distribution protocol, and store acquired quantum keys in an address range the same as that of the peer quantum key distribution device; a key verification unit 1302 configured to verify consistency of the quantum keys stored in the address range and quantum keys stored in the same address range by the peer quantum key distribution device; and a matching key sending unit 1303 configured to, in accordance with a quantum key acquisition request from a key management device, send quantum keys that pass consistency verification to the key management device according to the same address range negotiated with the peer quantum key distribution device.

Figure 14:
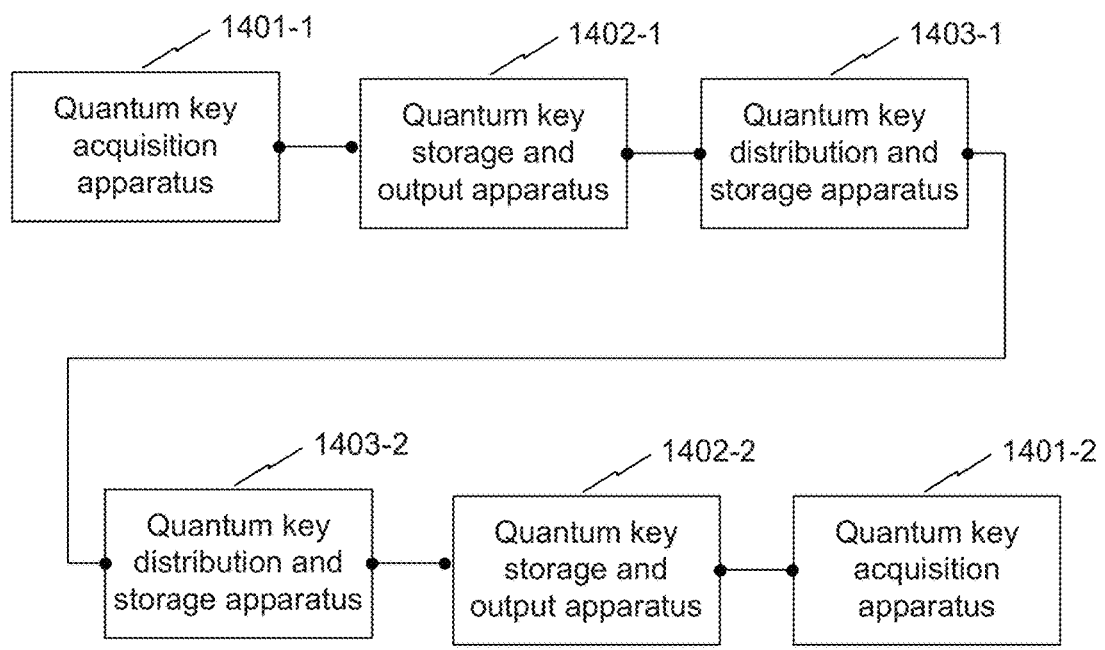
FIG. 14 is a block diagram illustrating a quantum key output system, according to an exemplary embodiment.

FIG. 14 is a block diagram illustrating a quantum key output system 1400, according to an exemplary embodiment. System 1400 may include two subsystems respectively deployed at a sender and a receiver. One subsystem may include: a quantum key acquisition apparatus 1401-1, a quantum key storage and output apparatus 1402-1 and a quantum key distribution and storage apparatus 1403-1, and the other subsystem may include: a quantum key acquisition apparatus 1401-2, a quantum key storage and output apparatus 1402-2, and a quantum key distribution and storage apparatus 1403-2.

The quantum key output system may adopt an operation mechanism of acquiring quantum keys in real time, and may also adopt an operation mechanism of pre-acquiring quantum keys. When the two operation mechanisms are adopted, interaction flows between various devices are described in above embodiments and are not repeated here.

Figure 15:
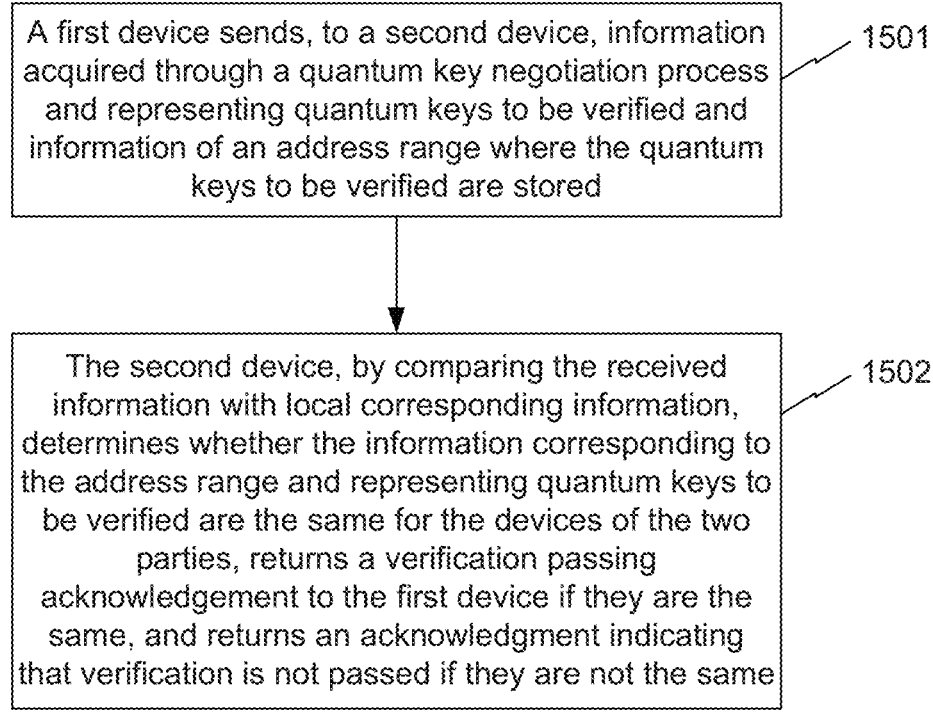
FIG. 15 is a flow diagram illustrating a method for verifying storage consistency of quantum keys, according to an exemplary embodiment.

In addition, a method for verifying storage consistency of quantum keys is disclosed, and the method can be implemented on a first device and a second device participating in verification. FIG. 15 is a flow diagram illustrating a method 1500 for verifying storage consistency of quantum keys, according to an exemplary embodiment. The parts of this embodiment similar to the embodiments described above are not repeated, and the following focuses on their differences. Method 1500 may be implemented by a non-transitory computer-readable storage medium storing one or more programs, the one or more programs comprising instructions which, when executed by a processor of a computer system, cause the computer system to perform method 1500. Method 1500 may include:

Step 1501: A first device sends, to a second device, information acquired through a quantum key negotiation process and representing quantum keys to be verified and information of an address range where the quantum keys to be verified are stored.

The information representing quantum keys to be verified may include sub-information units corresponding to the number of quantum key bits, and each sub-information unit may be a unique identification of a different quantum bit in the quantum keys to be verified, and may one-to-one correspond to a storage address of an identified quantum bit.

The information representing quantum keys to be verified may include: the quantum keys to be verified, and each quantum bit in the quantum keys may be the sub-information unit. When such a mechanism is adopted, the first device may calculate hash values of the quantum keys to be verified by using a preset hash algorithm, and send the hash values and the information of the address range to the second device.

The information representing quantum keys to be verified may further include: a key label sequence of the quantum keys to be verified, and each key label in the key label sequence is the sub-information unit. The information of an address range where the quantum keys to be verified are stored may include: an address sequence consisting of a storage address of each quantum bit in the quantum keys to be verified. When such a mechanism is adopted, the first device can calculate a hash value of a character string formed by concatenation of the key label sequence and the address sequence by using a preset hash algorithm, and send the hash value and the address sequence or the hash value and the key label sequence to the second device participating in verification.

In some embodiments, timestamp information of the quantum bit may be used as the key label.

Step 1502: The second device, by comparing the received information with local corresponding information, determines whether the information corresponding to the address range and representing quantum keys to be verified are the same for the devices of the two parties, returns a verification passing acknowledgement to the first device if they are the same, and returns an acknowledgment indicating that verification is not passed if they are not the same.

When the information representing quantum keys to be verified is the quantum keys to be verified per se, the second device can extract the information of an address range where the quantum keys to be verified are stored from the received information, by using the preset hash algorithm, calculate a hash value of quantum keys stored in a local same address range, compare the hash value obtained through calculation with received hash value, if they are the same, determine that the information corresponding to the address range and representing quantum keys to be verified are the same for the devices of the two parties, and return a verification passing acknowledgement to the first device, and otherwise, return an acknowledgment indicating that verification is not passed.

When the information representing quantum keys to be verified is a key label sequence of the quantum keys to be verified, the second device can extract a corresponding key label sequence locally in accordance with an address sequence extracted from the received information, or acquire a corresponding address sequence locally in accordance with extracted key label sequence, and calculate a hash value of a character string formed by concatenation of the key label sequence and the address sequence by using the preset hash algorithm; and determine whether the hash value obtained through calculation is the same as the received hash value, if they are the same, determine that the information corresponding to the address range and representing quantum keys to be verified are the same for the devices of the two parties, and return a verification passing acknowledgement to the first device, and otherwise, return an acknowledgment indicating that the verification is not passed.

The method for verifying storage consistency of quantum keys according to the present application can be implemented on devices of two parties that need to perform storage consistency verification of quantum keys, and the devices of two parties may be quantum key distribution devices of a sender and a receiver and may also be key management devices of the sender and the receiver.

When step 1501 is performed, the first device may encrypt information to be sent by using a key negotiated with the second device in advance; correspondingly, when step 1502 is performed, the second device, after receiving the information sent by the first device and using a corresponding key for decryption, may perform subsequent comparison and determination operations.

Through the method for verifying storage consistency of quantum keys, devices of two parties participating in verification, by comparing the information corresponding to the same address range and representing quantum keys to be verified between the two parties, can determine whether quantum keys stored in the same address range by the two parties are the same, thereby providing a basis for the two parties to output matching quantum keys outwards and providing guarantee for secure and efficient transmission of user data. In the case of use of a verification method based on key labels, consistency verification can be achieved by using a characteristic that a key label can uniquely identify a quantum bit and a corresponding relationship between key labels and storage addresses of quantum bits without transmitting quantum keys, thus further improving security of the quantum keys.

Figure 16:
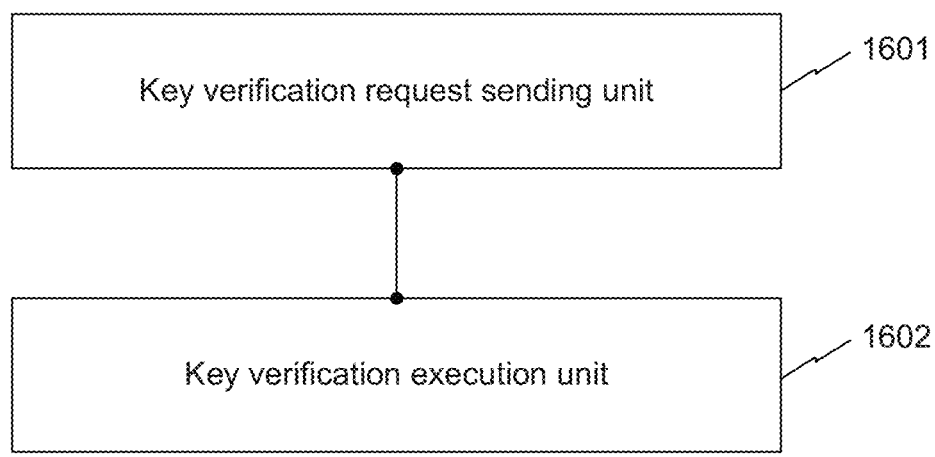
FIG. 16 is a block diagram illustrating an apparatus for verifying storage consistency of quantum keys, according to an exemplary embodiment.

A method for verifying storage consistency of quantum keys is disclosed, and correspondingly, an apparatus 1600 for verifying storage consistency of quantum keys is disclosed. FIG. 16 is a block diagram illustrating an apparatus 1600 for verifying storage consistency of quantum keys, according to an exemplary embodiment. Apparatus 1600 described below is merely schematic.

An apparatus for verifying storage consistency of quantum keys of this embodiment may include: a key verification request sending unit 1601 configured to send information acquired through a quantum key negotiation process and representing quantum keys to be verified and information of an address range where the quantum keys to be verified are stored; and a key verification execution unit 1602 configured to determine by comparing the received information with local corresponding information, whether the information corresponding to the address range and representing quantum keys to be verified are the same for the devices of the two parties, if they are the same, return a verification passing acknowledgement to the first device, and otherwise, return an acknowledgment indicating that verification is not passed. Key verification request sending unit 1601 may be implemented in a first device. Key verification execution unit 1602 may be implemented in a second device.

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular mechanism, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-readable storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be used to store information capable of being accessed by a computer device. The computer-readable storage medium is non-transitory, and does not include transitory media, such as modulated data signals and carrier waves.

The specification has described methods, apparatus, and systems for quantum key output, storage, and consistency verification. The illustrated steps are set out to explain the exemplary embodiments shown, and it should be anticipated that ongoing technological development will change the mechanism in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A quantum key storage method, comprising:
    acquiring, by a first quantum key management device, a first quantum key from a first quantum key distribution device; and
    storing, by the first quantum key management device, the acquired first quantum key in a first management device address range in a first storage media, the first management device address range having the same head address and tail address as a second management device address range in a second storage media for storing a corresponding second quantum key acquired by a second quantum key management device.

2. A quantum key output method, comprising:
    acquiring, by a first quantum key management device, a first quantum key from a first quantum key distribution device;
    storing, by the first quantum key management device, the acquired first quantum key in a first management device address range in a first storage media, the first management device address range having the same head address and tail address as a second management device address range in a second storage media for storing a corresponding second quantum key acquired by a second quantum key management device;
    performing a first consistency verification including determining, by the first quantum key management device, whether the first quantum key from the first quantum key distribution device is the same as the second quantum key; and
    outputting, by the first quantum key management device, the first quantum key, if the first quantum key is determined to be the same as the second quantum key.

3. The quantum key output method according to claim 2, further comprising:
    obtaining, by the first quantum key management device, a first key acquisition request from a first data device, before acquiring the first quantum key;
    acquiring, by the first quantum key management device, the first quantum key from the first quantum key distribution device, according to the obtained first key acquisition request; and
    sending, by the first quantum key management device, the first quantum key, to the first data device, if the first quantum key is determined to be the same as the second quantum key.

4. The quantum key output method according to claim 3, before obtaining, by the first quantum key management device, the first key acquisition request from the first data device, further comprising:
    negotiating, by the first quantum key distribution device and with the second quantum key distribution device, to generate the first and second quantum keys through a quantum key distribution protocol;
    storing, by the first quantum key distribution device, the first quantum key in a distribution device address range; and
    performing a second consistency verification including verifying, by the first quantum key distribution device, consistency of the first and second quantum key, wherein the first key management device acquires the first quantum key, which that is verified consistent with the second quantum key, from the first quantum key distribution device.

5. The quantum key output method according to claim 4, wherein the first quantum key that passes the first consistency verification is pre-stored in the first quantum key management device before the first quantum key management device receives the first key acquisition request; and
    the method further comprising:
    sending, by the first quantum key management device, a second key acquisition request to the first quantum key distribution device, and
    sending, by the first quantum key distribution device, the first quantum key stored in the distribution device address range to the first key management device.

6. The quantum key output method according to claim 5, before sending the second key acquisition request to the first quantum key distribution device, further comprising:
    notifying, by the first quantum key distribution device, the first key management device of a number of available quantum keys for acquisition.

7. The quantum key output method according to claim 3, after the first management device receives the first key acquisition request and before first management device sends the first quantum key that passes the first consistency verification to the first data device, further comprising:
    sending, by the first quantum key management device, a second key acquisition request to the first quantum key distribution device;
    negotiating, by the first quantum key distribution device and with the second quantum key distribution device, to generate the first and second quantum keys through a quantum key distribution protocol;

storing, by the first quantum key distribution device, the first quantum key in a distribution device address range; and sending, by the first quantum key distribution device, the stored first quantum key to the first key management device.

8. The quantum key output method according to claim 5, further comprising:

if the first quantum key management device determines that the first quantum key is not the same as the second quantum key, clearing, by the first quantum key management device, the first quantum key stored in the first management device address range; and sending, by the first quantum key management device, the second key acquisition request to the first quantum key distribution device.

9. The quantum key output method according to claim 7, wherein sending, by the first quantum key distribution device, the stored first quantum key to the first key management device, comprises:

performing a second consistency verification including verifying, by the first quantum key distribution device, consistency of the first and second quantum key; and sending, by the first quantum key distribution device, the first quantum key, that is verified consistent with the second quantum key, to the first key management device.

10. The quantum key output method according to claim 9, further comprising:

if the first quantum key management device determines that the first quantum key is not the same as the second quantum key, clearing, by the first quantum key distribution device, the first quantum key stored in the first management device address range; and negotiating, by the first quantum key distribution device and with the second quantum key distribution device, a new quantum key through the quantum key distribution protocol.

11. The quantum key output method according to claim 9, further comprising regularly verifying, by the first quantum key distribution device and with the second quantum key distribution device, consistency of the first and second quantum keys.

12. The quantum key output method according to claim 9, wherein performing the first consistency verification includes:

determining, by a first quantum key management device, a first hash value of a first quantum key by using a preset hash algorithm;

encrypting, by a first quantum key management device, the first hash value and information of the first management device address range by using the first quantum key that passes the first consistency verification;

sending, by the first quantum key management device, the encrypted information including the first hash value to the second quantum key management device;

decrypting, by the second quantum key management device, the received information by using the first quantum key;

acquiring, by the second quantum key management device, the information of the address range;

determining, by the second quantum key management device, a second hash value of the first quantum key stored in a corresponding management device address range by using the preset hash algorithm;

determining, by the second quantum key management device, whether the first hash value is the same as the second hash value; and if first hash value is determined to be the same as the second hash value, sending, by the second quantum key management device to the first quantum key management device, an acknowledgment indicating that the first consistency verification is passed.

13. The quantum key output method according to claim 3, further comprising:

after the first quantum key management device sends the first quantum key to the first data device, performing a third consistency verification including verifying, by the first data device and with a second data device, consistency of the received first quantum key and the second quantum key; and determining, by the first data device, that the first quantum key can be used for data encryption and decryption, if the first quantum key is determined to be consistent with the second quantum key.

14. The quantum key output method according to claim 13, further comprising:

if the first data device determines that the first quantum key is not consistent with the second quantum key, sending, by the first data device, the first key acquisition request to the first key management device.

15. The quantum key output method according to claim 13, wherein verifying, by the first data device, consistency of the acquired first quantum key comprises:

determining, by the first data device, a first hash value of the acquired first quantum key by using a preset hash algorithm;

encrypting, by the first data device, the first hash value by using the first quantum key that passes the first consistency verification;

sending, by the first data device, encrypted information including the first hash value to the second data device;

after the second data device decrypts the received information by using a corresponding key, determining, by the second data device, a second hash value of the second quantum key by using the preset hash algorithm;

determining whether the first hash value is the same as the second hash value; and if the first hash value is determined to be the same as the second hash value, returning, by the second data device, an acknowledgment indicating that the verification is passed to the first data device.

16. The quantum key output method according to claim 9, wherein the first and second quantum keys negotiated and acquired by the first and second quantum key distribution devices through the quantum key distribution protocol have corresponding key label sequences, and each key label in the key label sequence is a unique identification of a different quantum bit in the quantum keys; and the method further comprising:

correspondingly, after the first quantum key distribution device stores the first quantum key, establishing, by the first quantum key distribution device, a one-to-one corresponding relationship between a storage address of each quantum bit and a key label, wherein the information sent to the first quantum key management device by the first quantum key distribution device includes the first quantum key and a key label sequence corresponding to the first quantum key; and after the first quantum key management device stores the received first quantum key, establishing a one-to-one corresponding relationship between a storage address of each quantum bit and each key label.

17. The quantum key output method according to claim 16, wherein the information sent to the first data device by the first quantum key management device includes the first quantum key and a key label sequence of the first quantum key.

18. The quantum key output method according to claim 16, wherein:
the key label comprises timestamp information of the quantum bit; and
the timestamp information is acquired by the first quantum key distribution device when the first quantum key distribution device negotiates the first quantum key.

19. The quantum key output method according to claim 13, wherein the first and second data devices, the first and second quantum key management devices, and first and second quantum key distribution devices communicate with one another via a classical channel based on HTTPS connection.

20. The quantum key output method according to claim 13, wherein every two devices of the first and second data devices, the first and second quantum key management devices, and the first and second quantum key distribution devices, perform a two-way identity authentication before communicating.

21. A quantum key output system, comprising a first quantum key management device, which comprises:
a memory storing instructions; and
one or more processors configured to execute the instructions to:
acquire a first quantum key from a first quantum key distribution device;
store the acquired first quantum key in a first management device address range in a first storage media, the first management device address range having the same head address and tail address as a second management device address range in a second storage media for storing a corresponding second quantum key acquired by a second quantum key management device;
perform a first consistency verification including determining whether the first quantum key from the first quantum key distribution device is the same as the second quantum key; and
output the first quantum key, if the first quantum key is determined to be the same as the second quantum key.

22. A non-transitory computer-readable storage medium that stores a set of instructions that is executable by at least one processor of a first quantum key management device to cause the first quantum key management device to perform a method comprising:
acquiring a first quantum key from a first quantum key distribution device;
storing the acquired first quantum key in a first management device address range in a first storage media, the first management device address range having the same head address and tail address as a second management device address range in a second storage media for storing a corresponding second quantum key acquired by a second quantum key management device;
performing a first consistency verification including determining whether the first quantum key from the first quantum key distribution device is the same as the second quantum key; and
providing for output the first quantum key, if the first quantum key is determined to be the same as the second quantum key.

23. A quantum key storage system, comprising a first quantum key management device, which comprises:
a memory storing instructions; and
one or more processors configured to execute the instructions to:
acquire a first quantum key from a first quantum key distribution device; and
store the acquired first quantum key in a first management device address range in a first storage media, the first management device address range having the same head address and tail address as a second management device address range in a second storage media for storing a corresponding second quantum key acquired by a second quantum key management device.

24. A non-transitory computer-readable storage medium that stores a set of instructions that is executable by at least one processor of a first quantum key management device to cause the first quantum key management device to perform a method comprising:
acquiring a first quantum key from a first quantum key distribution device; and
storing the acquired first quantum key in a first management device address range in a first storage media, the first management device address range having the same head address and tail address as a second management device address range in a second storage media for storing a corresponding second quantum key acquired by a second quantum key management device.

* * * * *